Figure 15:
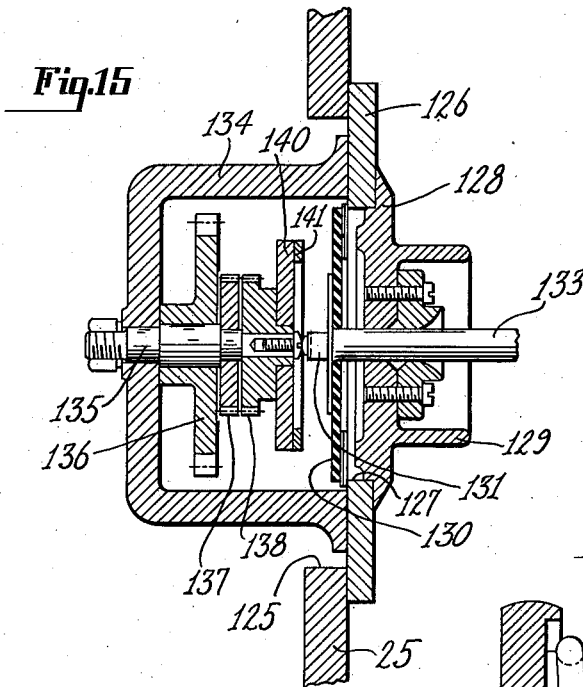

Dec. 18, 1945.   G. H. LELAND   2,391,172
HOISTING MECHANISM
Filed Aug. 27, 1942   10 Sheets-Sheet 1
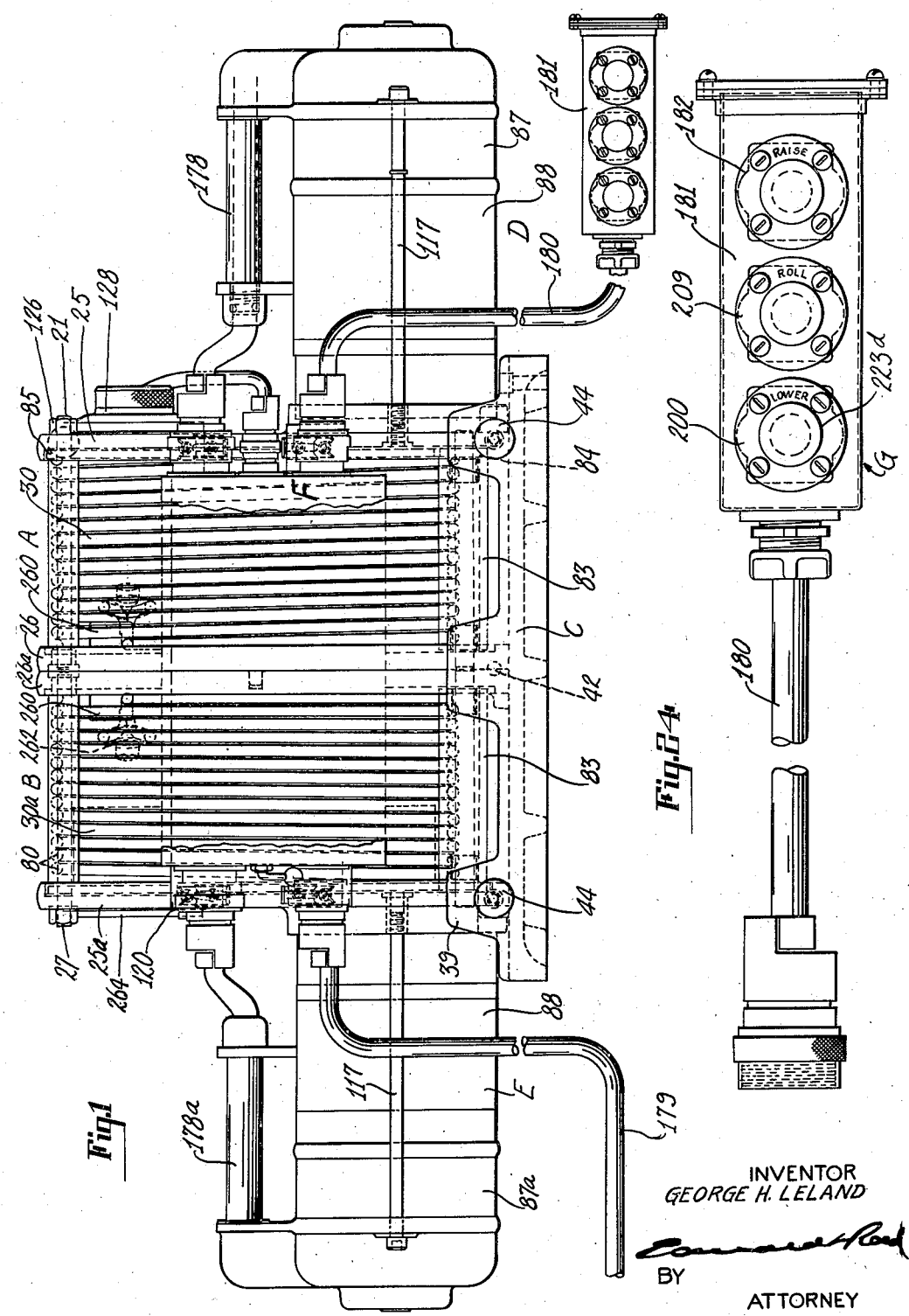

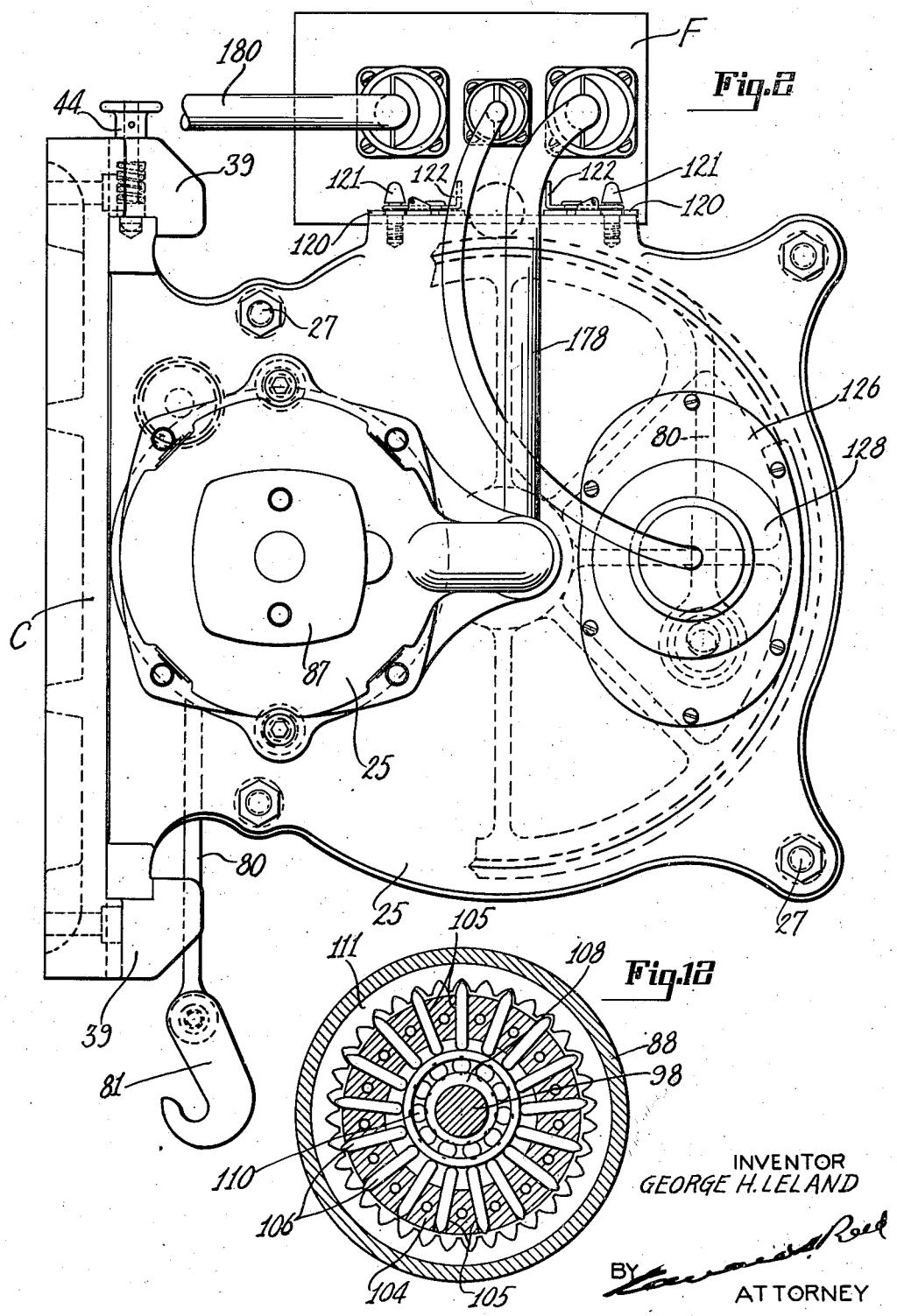

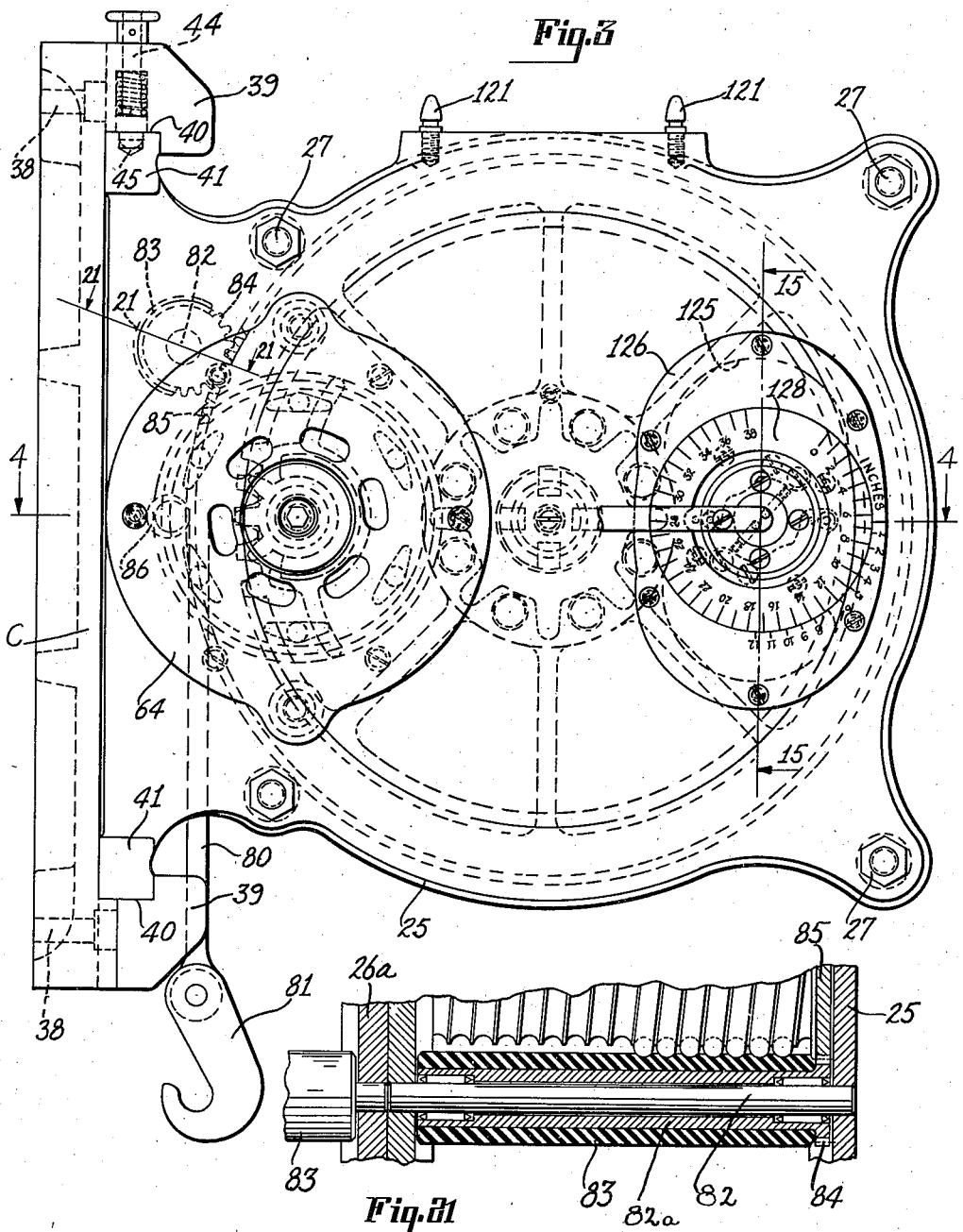

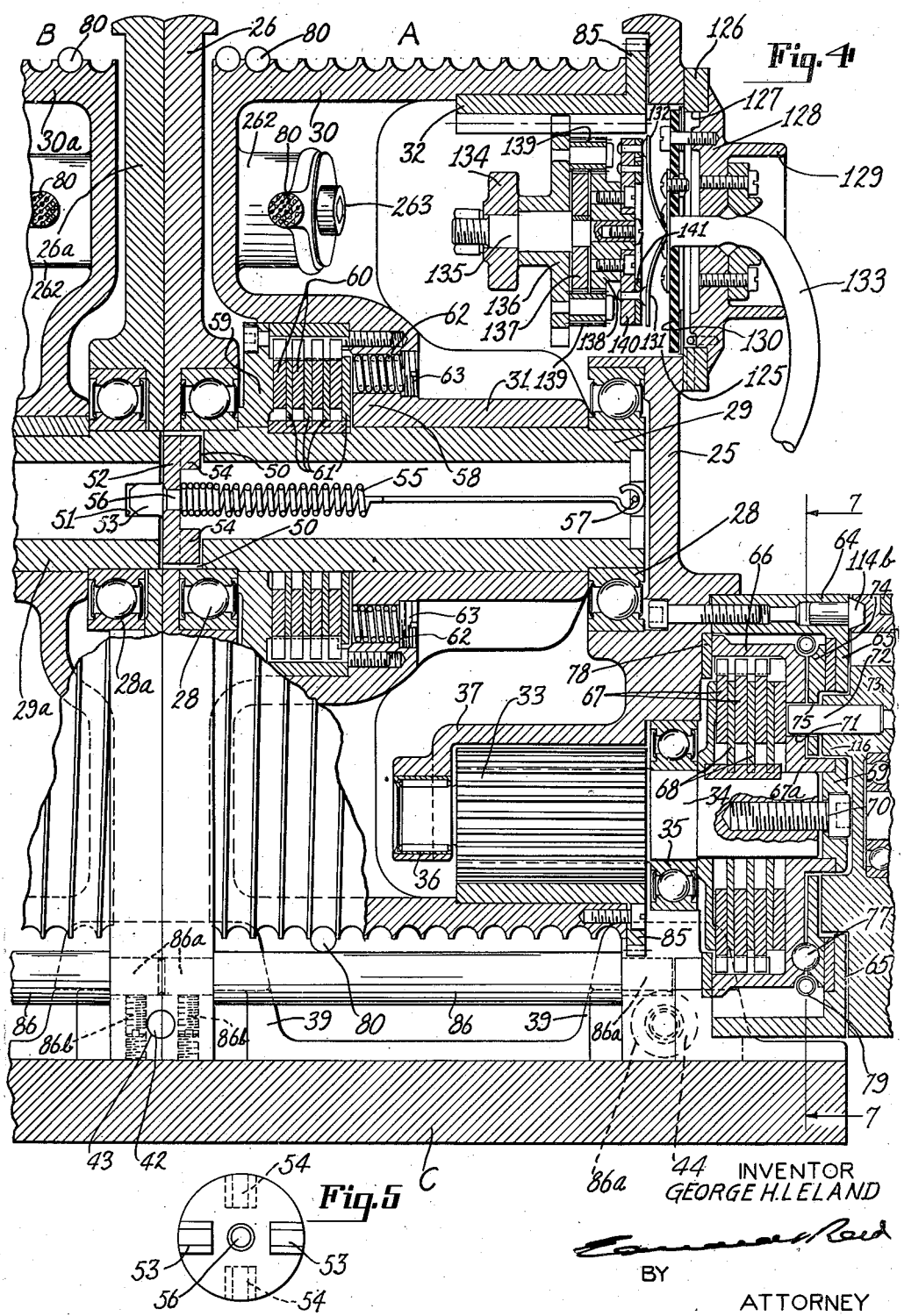

Dec. 18, 1945.   G. H. LELAND   2,391,172
HOISTING MECHANISM
Filed Aug. 27, 1942   10 Sheets-Sheet 5
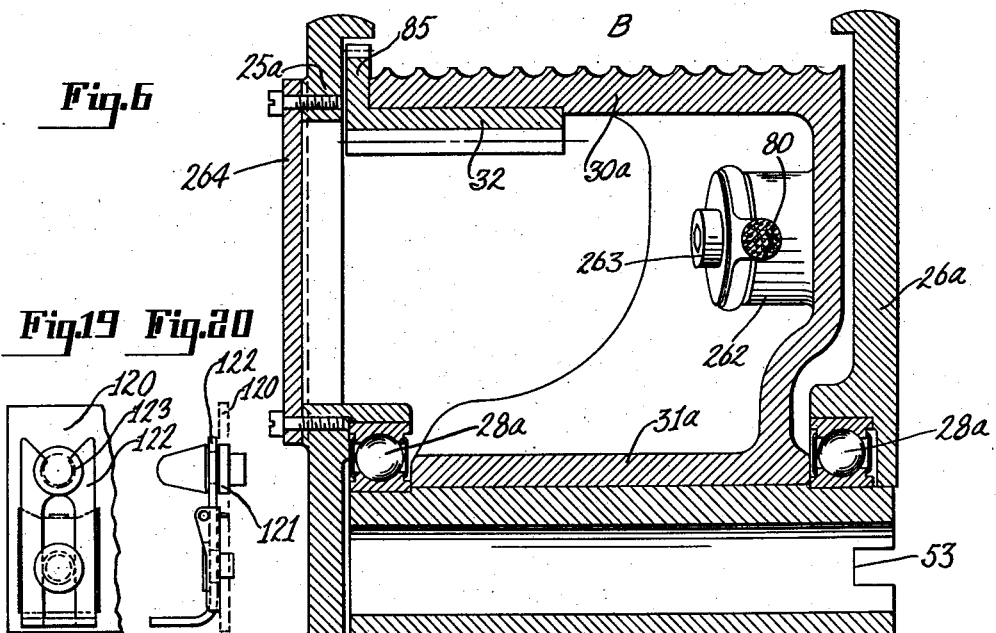
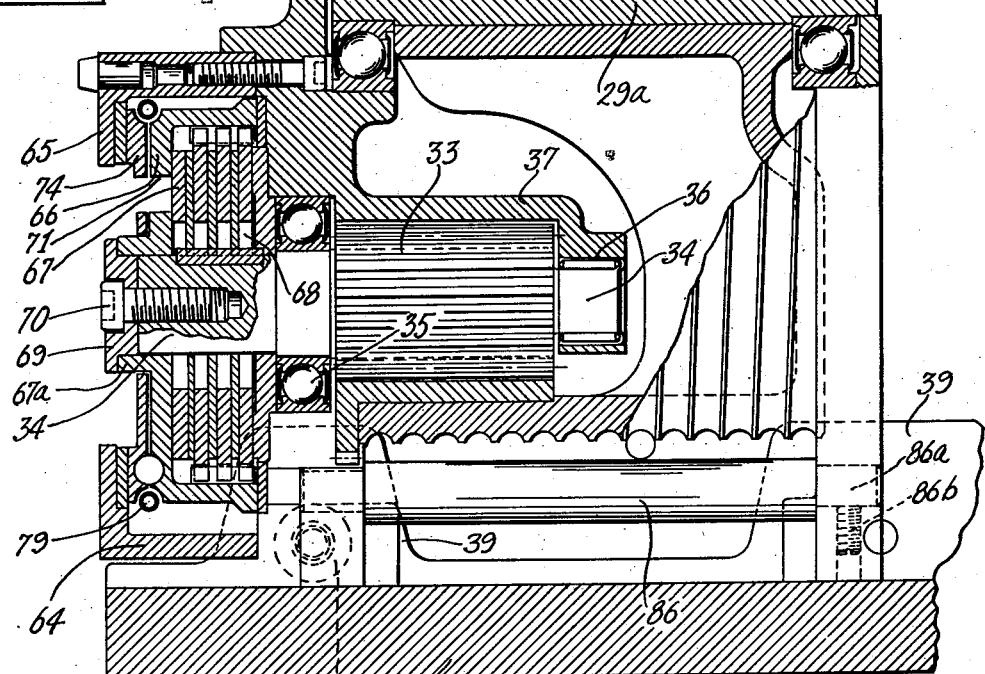
INVENTOR
GEORGE H. LELAND
BY
ATTORNEY

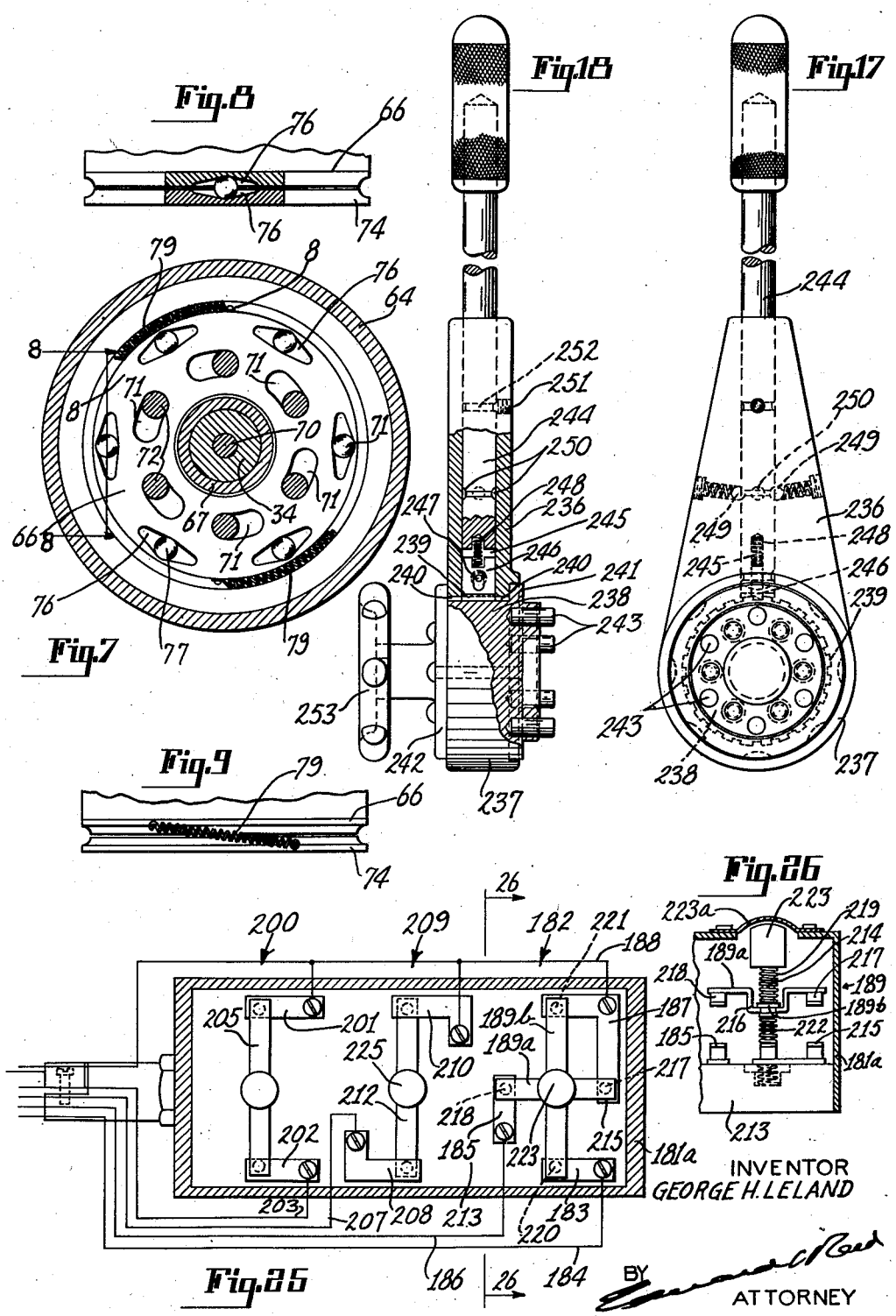

Dec. 18, 1945. G. H. LELAND 2,391,172
HOISTING MECHANISM
Filed Aug. 27, 1942 10 Sheets-Sheet 7
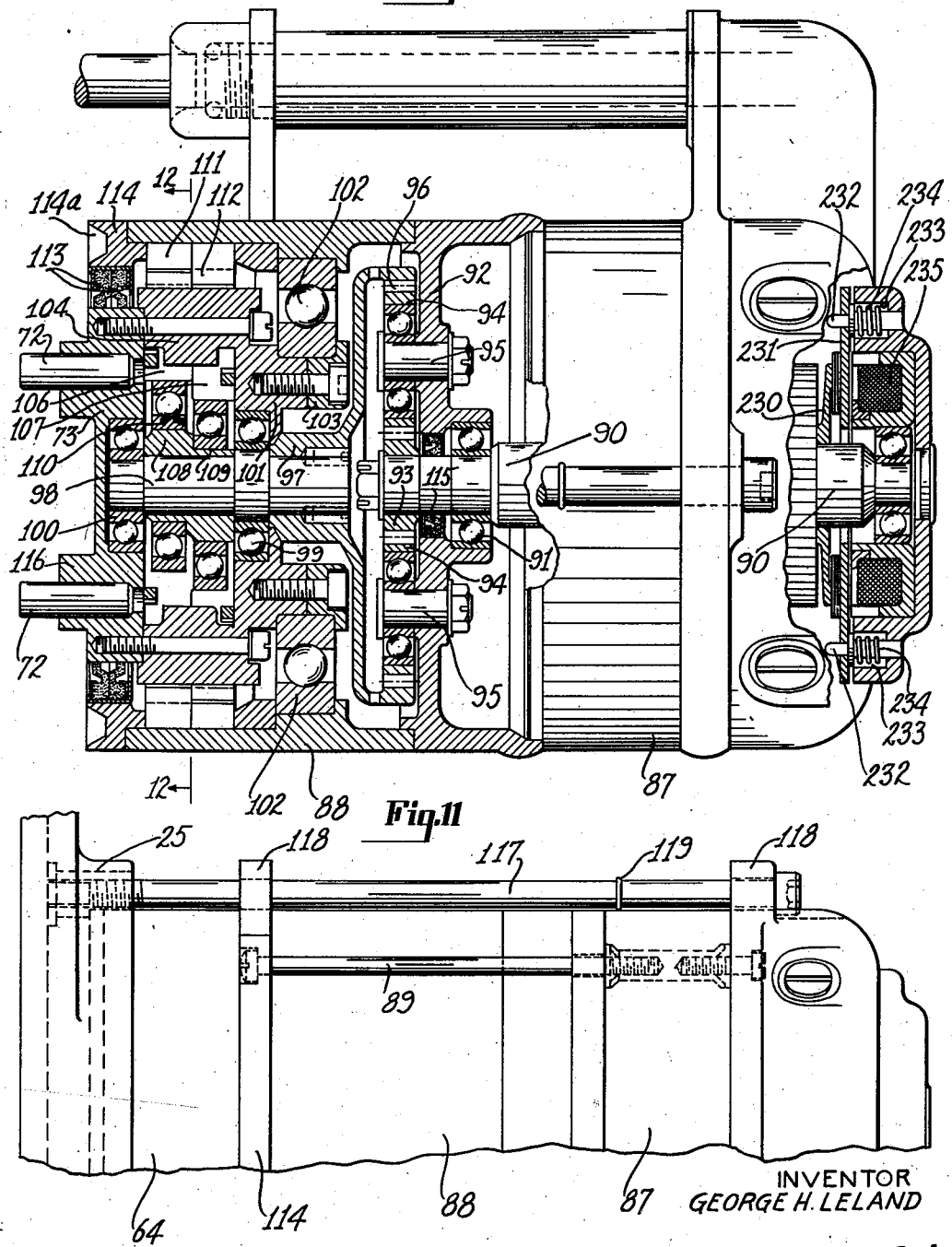
INVENTOR
GEORGE H. LELAND
BY
ATTORNEY Dec. 18, 1945.  G. H. LELAND  2,391,172
HOISTING MECHANISM
Filed Aug. 27, 1942  10 Sheets-Sheet 8
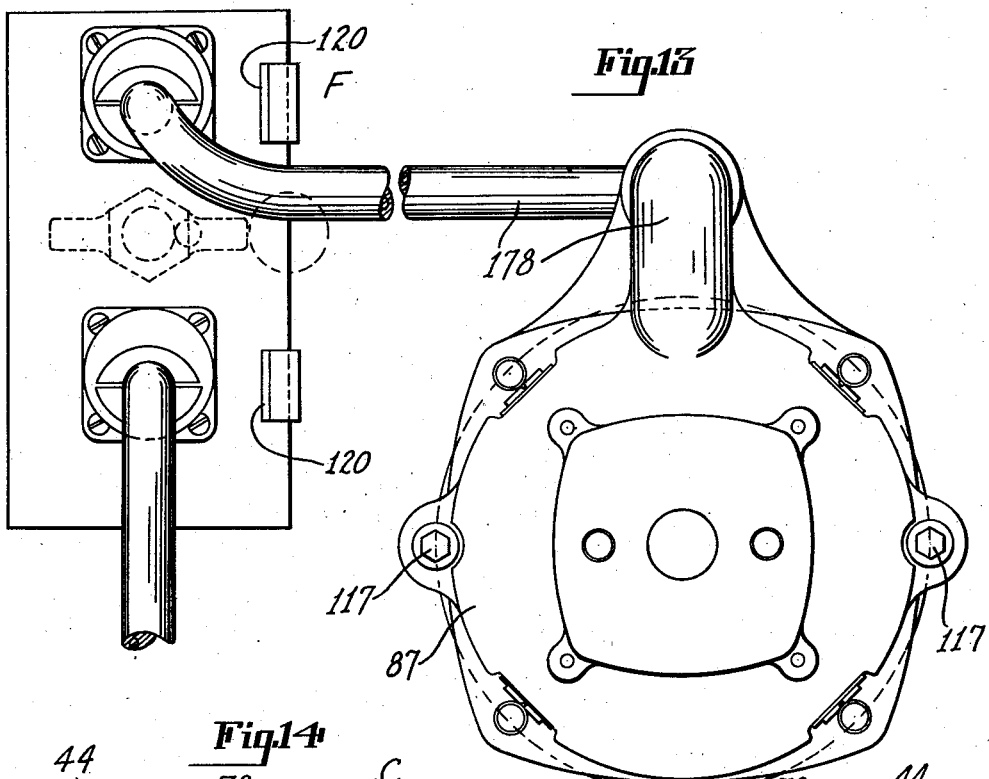
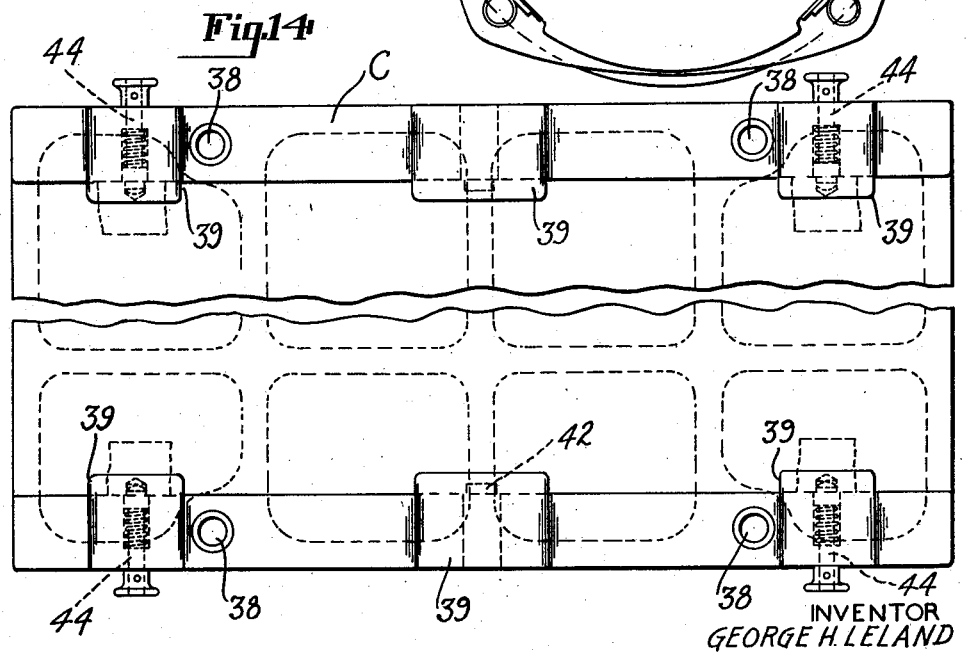
INVENTOR
GEORGE H. LELAND
BY
ATTORNEY Dec. 18, 1945.  G. H. LELAND  2,391,172
HOISTING MECHANISM
Filed Aug. 27, 1942  10 Sheets-Sheet 9

INVENTOR
GEORGE H. LELAND
BY
ATTORNEY

Dec. 18, 1945. G. H. LELAND 2,391,172
HOISTING MECHANISM
Filed Aug. 27, 1942 10 Sheets-Sheet 10
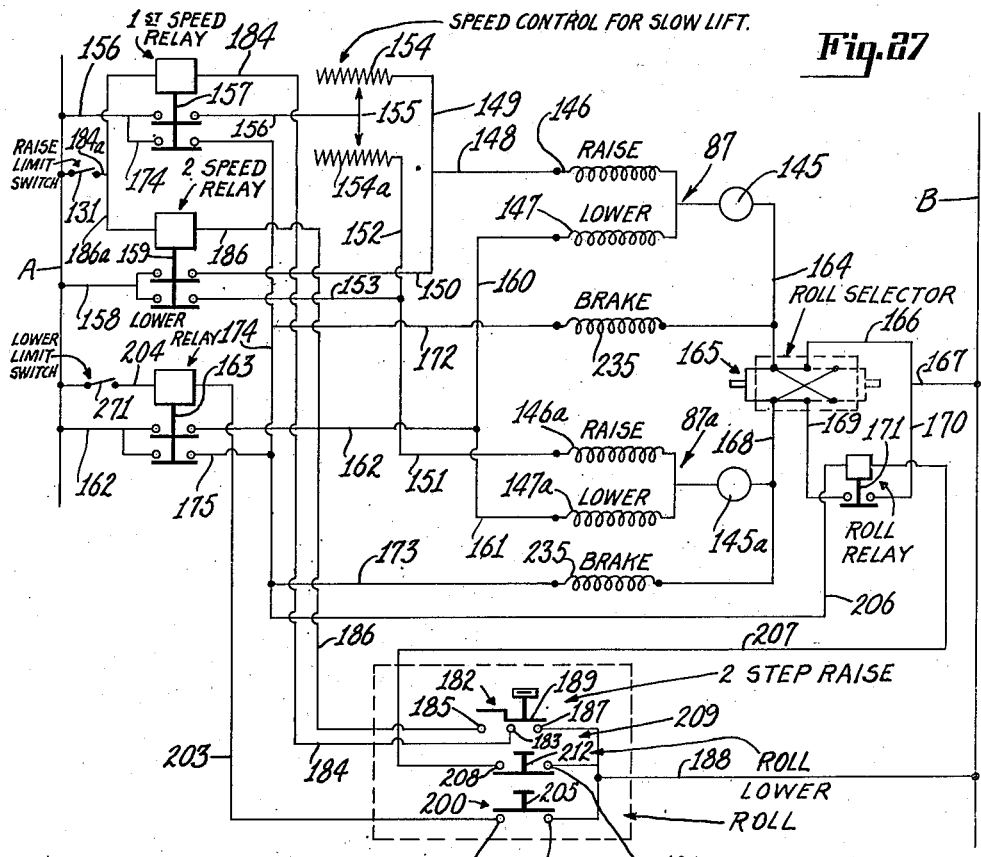
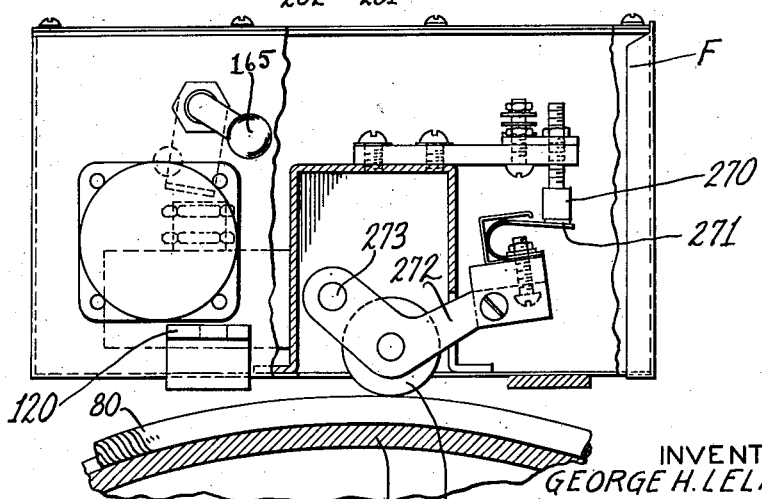
INVENTOR
GEORGE H. LELAND
BY
ATTORNEY Patented Dec. 18, 1945

2,391,172

UNITED STATES PATENT OFFICE 2,391,172

HOISTING MECHANISM

George H. Leland, Dayton, Ohio

Application August 27, 1942, Serial No. 456,422

19 Claims. (Cl. 254—185)

This invention relates to hoisting mechanisms and is designed primarily for loading bombs on airplanes. The bombs carried by airplanes vary in weight from a few pounds to several thousand pounds and it is necessary to provide hoisting mechanism for elevating the heavier bombs to the positions in which they are to be supported on the airplane. It has been customary heretofore to provide for this purpose two separate manually operated hoisting mechanisms each comprising a drum and cable. These were so mounted on the airplane that the cables extended downwardly either directly from the drums or about guide sheaves and the lower ends of the cables were provided with means for attaching the same to the respective ends of the sling on which the bomb was supported. Each hoisting mechanism was provided with a crank or other manually operated device for rotating the cable drum, and with such a mechanism the loading of the bombs was a slow and difficult operation particularly with bombs of great weight. Further, the means for supporting the bombs on the airplane are mounted in fixed positions and the bombs are provided with attaching devices which must be in predetermined positions in order that they may be connected with the supporting means and difficulty was experienced in properly positioning the attaching devices when the bomb was in its elevated position.

One object of the invention is to provide a power operated hoisting mechanism in which the cable drums and the operating means therefor are assembled in a single mechanism adapted to be removably mounted in the limited space available in the bomb bay of an airplane.

A further object of the invention is to provide a hoisting mechanism having two cable drums which may be rotated simultaneously to hoist the bomb or separately to rotate the bomb about its longitudinal axis to properly position the actuating device.

A further object of the invention is to provide such a hoisting mechanism in which the drum or drums will be operated by electric motors which will be controlled by remote control means.

A further object of the invention is to provide such a twin drum hoisting mechanism in which the rotation of the two drums will be automatically synchronized should the rotating means therefor tend to move at different speeds, but in which one drum may be rotated with relation to the other when desired.

A further object of the invention is to provide a hoisting mechanism in which the cable drum may be rotated in either direction by its actuating means but will be locked against rotation in a reverse direction when the application of force thereto by said actuating means is interrupted.

A further object of the invention is to provide a hoisting mechanism in which a free fall of the load on the cables will be quickly stopped without subjecting the mechanism to a severe shock.

A further object of the invention is to provide a hoisting mechanism in which the power unit is separate from and detachably mounted on the drum unit and drivingly connected with the drum rotating means.

A further object of the invention is to provide a hoisting mechanism with a motor for driving the cable drum in which the motor shaft will be immediately locked against rotation upon the discontinuance of the flow of current to the motor.

A further object of the invention is to provide a hoisting mechanism with means for interrupting the rotation of the drum when a predetermined length of cable has been wound thereon, that is, when the load has been hoisted a predetermined distance.

A further object of the invention is to provide a hoisting mechanism in which the rotation of the drum will be interrupted when a predetermined portion of the cable has been unwound therefrom.

A further object of the invention is to provide a hoisting mechanism comprising a plurality of separately portable units adapted to be quickly and easily assembled in operative relation one to the other.

A further object of the invention is to provide simple easily operated mechanism for controlling the rotation of the drum or drums.

A further object of the invention is to provide a controlling mechanism including an easily portable switch unit for controlling the rotation of the drum or drums from a point remote therefrom.

Other objects of the invention may appear as the mechanism is described in detail.

Figure 22:
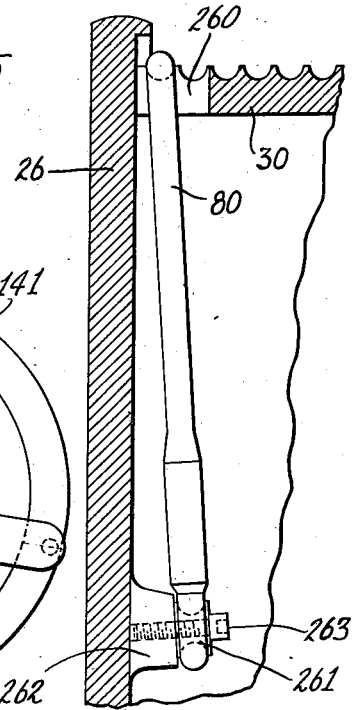
Figure 16:
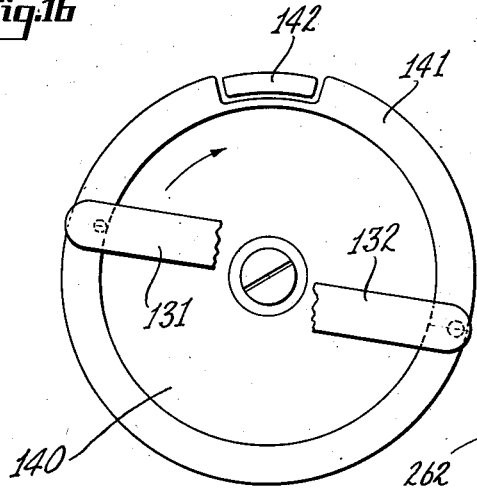

In the accompanying drawings Fig. 1 is a top plan view of a hoisting mechanism embodying my invention, partly broken away; Fig. 2 is an end elevation of such a mechanism with the motor unit attached; Fig. 3 is an end elevation of one of the drum units, with the motor unit removed; Fig. 4 is a sectional view of the right hand drum unit and a portion of the left hand drum unit, taken on the line 4—4 of Fig. 3, with a portion of the structure in plan; Fig. 5 is a detail view of the device for coupling the drum shafts one to the other; Fig. 6 is a horizontal sectional view of the left hand drum unit; Fig. 7 is a sectional view taken on the line 7—7 of Fig. 4; Fig. 8 is a plan view of the device shown in Fig. 7, partly in section on the line 8—8 of Fig. 7; Fig. 9 is an edge view of the device of Fig. 7; Fig. 10 is a plan view, partly in section, of the motor unit; Fig. 11 is a side elevation of a portion of the motor unit; Fig. 12 is a section taken on the line 12—12 of Fig. 10; Fig. 13 is an end view of the motor unit and control box; Fig. 14 is a front elevation, partly broken away, of the base; Fig. 15 is a sectional view of the limit switch taken on the line 15—15 of Fig. 3; Fig. 16 is an elevation of the rotating contact member of the limit switch; Fig. 17 is an elevation, partly broken away, of an emergency operating device for the hoisting drum; Fig. 18 is a side elevation of the emergency operating device, partly in section; Fig. 19 is a plan view of a latch for connecting the control box to the drum units; Fig. 20 is a side elevation of that latch; Fig. 21 is a section on the line 21—21 of Fig. 3 showing rubber covered guide roller partly in section; Fig. 22 is a detail view of the connection between the cable and the drum; Fig. 23 is an end elevation of the control box partly broken away to show the cable controlled limit switch; Fig. 24 is a plan view of the switch unit; Fig. 25 is a sectional view of the switch unit showing the switch elements in plan; Fig. 26 is a sectional view taken on the line 26—26 of Fig. 25; and Fig. 27 is a circuit diagram.

In these drawings I have illustrated one embodiment of the invention and have shown the same as a twin drum hoist particularly adapted for loading bombs on airplanes but it is to be understood that the mechanism may take various forms and may be used for various purposes and that many features of the invention may be utilized in hoisting mechanism having a single cable drum.

The bomb hoisting mechanisms are not usually permanently mounted on the airplane but are usually retained at the loading fields and are mounted on the airplanes when the latter are to be loaded. The mounting of the hoisting mechanism on the airplane and its removal therefrom must often be accomplished by men working under very adverse conditions and it is highly desirable that the mechanism shall be of such a character that it can be easily handled and easily attached to and removed from the airplane. For this purpose it is preferable that the mechanism as a whole should comprise a plurality of separate units each of such size and weight that it can be easily handled by a single person and which can be quickly and easily attached one to the other as they are mounted on the airplane. In the present instance the hoist comprises two drum units A and B, a base C on which the drum units may be quickly and easily mounted in proper operative relation one to the other, two motor units D and E detachably connected with the respective drum units A and B, a control unit F which can be detachably mounted on the drum units, and a switch unit G adapted to be connected by a flexible cable with the control unit.

The two drum units are substantially identical in their main features of construction and each comprises end frame members indicated at 25 and 26 in unit A and at 25a and 26a in unit B, the end frame members of each unit being rigidly connected one to the other by tie rods 27. The end members of each unit (Figs. 4 and 6) support alined bearings 28 and 28a in which are mounted drum shafts 29 and 29a, both shafts being preferably tubular in form. The drums 30 and 30a are arranged between the end members of each unit and are provided with hub portions 31 and 31a mounted on the respective drum shafts 29 and 29a. Each drum is open at its outer end and has mounted therein a circumferential internal gear 32 with which meshes a driving gear 33 rigidly secured to a drive shaft 34 journaled at its outer end in a bearing 35 in the outer end frame member 25 and journaled at its inner end in a bearing 36 carried by a bracket 37 rigidly connected with and extending inwardly from the end frame member, the drive shaft being provided with suitable means whereby it may be connected with the motor unit for rotation thereby, as hereinafter described.

Any suitable means may be provided for mounting the drum units on the airplane but I prefer to provide the base C to which the drum units may be quickly and easily attached and which may be either detachably secured to the airplane for removal when the hoisting mechanism is removed or may be permanently attached to the airplane. As shown more particularly in Figs. 3 and 14 the base is substantially rectangular in shape and is of a length at least equal to the combined length of the two drum units and of a width approximating the width of those units. This base is usually mounted in a vertical position on some part of the airplane structure, such as a partition or frame members, and it is provided with means for connecting the same with the supporting structure. In the present instance this means is shown as openings 38 adapted to receive bolts or other attaching devices. At its upper and lower edges, as shown in Fig. 3, the base is provided with a plurality of laterally extending lugs, there being in the present instance three lugs 39 at each edge of the base. The lugs at each edge of the base are provided on their inner sides with longitudinal recesses 40 arranged in alinement to form guideways adapted to receive projections or feet 41 carried by the frame members of the drum units. The feet of the two drum units are inserted in the guideways from the opposite ends of the base and a stop is provided for limiting the inward movement of the units and for properly positioning the same. Preferably this stop consists of a pin 42 extending through the base adjacent the intermediate lug and into the paths of the two units, the feet of the units which contact with the stop pin being provided with recesses, as shown at 43 in Fig. 4, to receive the stop pin and permit the inner end walls 26—26a of the two units to be moved into abutting contact or into positions close one to the other, in which positions the drum shafts 29 and 29a are in axial alinement. Releasable means are provided for retaining the drum units on the base after they have been properly positioned thereon and, in the present instance, spring pressed plungers 44 are slidably mounted in the end lugs on at least one side of the base and are adapted to enter recesses 45 in the feet of the frame members.

The motors of the two motor units and the driving connections between the same and the respective drums are substantially identical and are designed to drive the two drums at exactly the same speeds. However, due to minor variations in the electrical characteristics of the motors, or for other reasons, the driving mechanism will at times tend to rotate one drum at a greater speed than the other and in order to prevent the two drums from rotating at different speeds means are provided for so connecting the drum shafts one with the other that they will be caused to rotate in synchronism. The driving connection between the shafts should, however, be such as to compensate for any slight mis-alinement of the shafts due to the detachable mounting of the drum units. I have therefore provided the adjacent ends of the two tubular drum shafts (29 and 29a) with notches 50 and 51 respectively, the notches 50 in the shaft 29 being in a plane substantially at right angles to the plane of the notches 50 in the shaft 29a. The coupling member comprises a disk 52 located between the ends of the shafts and provided on the two faces thereof with lugs 53 and 54 respectively adapted to enter the slots 51 and 50 in the two shafts. The lugs are of such width that they will fit snugly within the notches so that the shafts will have no appreciable rotative movement with relation thereto but they are of a depth slightly less than the depth of the notches so as to provide a small clearance which will permit of a slight tilting movement of the coupling member without interfering with the driving connection between the two shafts. The coupling member is preferably yieldably retained on the shaft 29, so that it may have tilting movement with relation thereto, by means of a spring 55 which is connected at one end with a stud 56 in the disk 52 and at its other end with a pin or other attaching device 57 mounted in the shaft. Thus if one drum tends to rotate at a higher speed than the other drum the connection between the two shafts will tend to retard that rotation and may or may not cause the other drum to move at a slightly increased speed but in any event the drums will rotate at the same speed.

However, it is at times necessary or desirable to rotate one drum with relation to the other. For example, if a bomb when hoisted to the proper level is so positioned that the attaching devices carried thereby cannot be engaged with the supporting shackles in the bomb bay it is necessary to rotate or "roll" the bomb about its longitudinal axis to the proper position and this is done by rotating one drum and holding the other drum against rotation. To permit this relative rotation of the two drums one of the drums, in the present instance the drum of unit A, is connected with its shaft through friction devices while the drum of the other unit is rigidly secured to its shaft. The frictional resistance between the drum of unit A and its shaft is sufficient to prevent the rotation of the drum with relation to its shaft under all ordinary hoisting operations when both drums are free to rotate, but if the drum of unit B is held against rotation, as it is when its motor is not operating, the drum of unit A can rotate on its shaft and with relation to the drum of unit B, or if the drum of unit A is held against rotation its shaft may be rotated with relation thereto by the shaft of unit B. In the present instance the hub 31 of the drum 30 of unit A is shaped to provide the same with a circumferential portion 58 extending radially to the shaft 29, and rigidly secured to the hub in spaced relation to the projection 58 is an abutment 59. Mounted in the space between the abutment and the projection is a series of clutch plates 60 connected with the drum structure for rotation therewith, and interleaved between the plates 60 are other clutch plates 61 rigidly connected with the shaft for rotation therewith. Both series of plates are capable of a limited axial movement and the plates of the two series are pressed into firm frictional contact one with the other by springs 62 mounted in recesses in the circumferential projection 58 and acting on the adjacent plate 61. The springs are retained in the recesses and the compression thereof regulated by plugs 63 screw threaded into the outer ends of the spring openings.

The driving mechanism for the drums may be connected with the motor units in any suitable manner but it is desirable that each such connection should include means independent of the motor unit for preventing the rotation of the drum by the load on the cable and for absorbing shocks to which the mechanism might be subjected, as by a free fall of the load on the cables. In the present construction each unit is provided on the outer side of the outer frame member, 25 and 25a, with an annular member 64 extending about and spaced from the driving shaft 34 and having an inwardly extending flange 65, the annular member and flange constituting a housing which encloses a slip clutch and forms a part of a self-locking device. The slip clutch in the form here shown comprises a cup-shaped clutch member 66 having a hub portion 67a mounted on the end portion of the shaft 34 and capable of rotary movement with relation to the shaft. Interposed between the axial portion of the clutch member 66 and the shaft is a series of clutch plates 67 secured to the clutch member, and a second series of clutch plates 68 secured to the shaft. These clutch plates are pressed into firm contact by a disk-like cap 69 which engages the outer end of the hub 67a of the clutch member and is connected with the end of the shaft by a screw 70 whereby the frictional contact between the clutch plates 67 and 68 may be adjusted and maintained. This frictional contact is such that the driving force applied to the clutch member 66 will be transmitted to the shaft so as to elevate the load on the drum under all normal operating conditions but to permit a slight slipping of the clutch plates in the event the driving shaft should be subjected suddenly to a heavy load, such as sometimes occur when bombs are being loaded from a barge onto a seaplane and the swell of the sea is such as to produce sufficient slack in the cable to permit the bomb to have a free fall. With a heavy bomb the force of such a free fall, if suddenly stopped by the cables, might injure the cables or other parts of the mechanism but the slip clutch here shown will check the fall of the bomb very quickly and will slip sufficiently to absorb the shock.

The clutch member 66 is provided with a circumferential series of arcuate slots 71 (Fig. 7) adapted to receive driving studs 72 carried by the rotatable member 73 forming a part of the motor unit, to be hereinafter described. The means for locking the drive shaft, and therefore the drum, against rotation must be of such a character that the shaft can be rotated in either direction by the driving unit, or other actuating device, but will be positively prevented from rotation by the weight of the load on the drum when the motor unit is disconnected therefrom or in the event of the failure of power supply or the like. For the purpose of so preventing the rotation of the drum I have mounted between the radial face of the clutch member 66 and the flange 65 of the housing an annular member 74 which is free to rotate about the hub of the clutch member 66 and to move axially with relation thereto (Figs. 4 and 7 to 9). One or both of the adjacent faces of the member 74 and flange 65 is provided with a facing of friction material. The annular member 74 has a series of arcuate slots 75 of the same size, shape and arrangement as the slots 71 of the clutch member 66 and the driving studs 72 extend through the annular member 74 into the clutch member 66. The clutch member 66 and the annular member 74 are provided in their adjacent faces with opposed tapered grooves 76 and balls 77 are mounted in the grooves of the respective pairs of grooves. The arrangement of the grooves with relation to the slots 71 is such that when the driving studs are rotated in either direction about the shaft 34 each stud will move into engagement with one end of a slot 71 in the clutch member 66 and with the corresponding end of a slot in the annular member 74 and the two members will rotate in unison and the driving force will be transmitted from the clutch member 66 to the drive shaft. When the annular member is in this position with relation to the clutch member the balls will be in the deepest parts of the grooves and the annular member 74 will have little or no frictional contact with the flange 65. However, should the driving studs be withdrawn from the clutch member or should the rotatable member 73 of the motor unit be released for rotation the load on the drum will tend to rotate the drive shaft in a direction reverse to that in which it rotates to lift the load and rotative force will be exerted by the shaft on the clutch member 66. The force thus exerted on the clutch member will tend to rotate the same with relation to the annular member 74 and thereby displace the opposed tapered grooves with relation one to the other and cause the balls to be wedged in the grooves and move the member 74 into frictional contact with the member 65, and rigidly connect the annular member 74 with the clutch member 66. The first contact of the member 74 with the flange 65 tends to further retard its movement and thus increase the movement of the clutch member with relation thereto, thus wedging the balls tightly in their grooves and causing the frictional contact between the member 74 and flange 65 to strongly resist the force exerted on the clutch member and to positively lock the driving shaft and drum against rotation. If desired, the end member 25 of the drum unit may be provided with a facing of friction material 78 which will be engaged by the end of the clutch member 66 and thus increase the resistance to the rotation of the clutch member. It is desirable that this self-locking action should take place instantly upon the exertion of any force on the clutch member by the shaft. I have therefore provided means for holding the annular member 74 in light frictional contact with the flange 65 at all times during the rotation of the drum in hoisting direction, without offering appreciable resistance to its rotation. For this purpose I have connected the member 74 with the clutch member 66 by a spring which will tend to move the annular member with relation to the clutch member so as to displace the opposed grooves sufficiently to move the member 74 into light contact with the member 65. As here shown a coiled spring or springs 79 extends, or extend, circumferentially of the two members and is connected at its ends with the respective members.

When the drum units are mounted on the vertical base the cables 80 may extend downwardly directly from the drum, as shown in Fig. 3, or, in some installations, one or both cables may extend about a guide pulley, or pulleys, and thence downwardly. Each cable is provided at its lower end with means for connecting the same with the load to be hoisted and in the present instance this means is shown as comprising hooks 81 adapted to engage the respective ends of a sling on which the bomb is supported. Under some conditions of operation, more particularly during the lowering operation, there is sometimes such slack in the cable that the windings on the drum become loose and have a tendency to shift from one drum groove to another. To prevent this I have provided a guide roller for each drum arranged to engage the respective cables and retain the same in their respective grooves. The roller for each drum unit comprises a shaft 82 (Figs. 3 and 21) extending lengthwise of the drum and mounted in the end frame members. Mounted on this shaft 82 is a tubular shaft 82a having a relatively thick covering of soft rubber 83 or the like. This roller is preferably arranged to engage the cable windings some distance above the line at which the cable leaves the drum, as shown in Figs. 1 and 3. Preferably each roller is so located that the windings of the cable on the drum will press into the rubber covering, and the rollers are rotated at substantially the same peripheral speed as the drums and in the opposite direction so that the adjacent portions of the rollers and drums will move in the same direction. In the arrangement illustrated the shaft of each roller has secured thereto a pinion 84 which meshes with a gear 85 rigidly secured to the corresponding drum and here shown as formed integral with the driving gear 32. During the hoisting operation the cable is sometimes moved out of parallelism with the spiral groove in the drum and, as it is wound onto the drum, has a tendency to climb over the edge of the groove and to enter, or extend across a portion of, an adjacent groove. To prevent this displacement of the cable each drum unit is provided with a stationary guide rod 86 extending lengthwise of the drum close to the line of tangential contact of the cable with the drum as it is wound onto the same. This rod is spaced from the drum such a distance that it will lie close to or in light contact with the cable and prevent the displacement thereof without exerting appreciable friction on the cable. Preferably the rod is cylindrical in form and is provided at its ends with eccentric pintles 86a which are mounted in bearings in the respective frame members, so that the spacing of the rod from the drum may be varied by rotating the rod in its bearings. The rod is normally held against such rotation by set screws 86b which engage the respective pintles.

The cables may be secured to the respective drums in any suitable manner but I have provided a connecting device which is very simple and can be easily operated to connect and disconnect the cable from the drum. The end of the cable is carried into the drum through an opening 260 in the peripheral wall thereof, as shown in Fig. 1, and an eyelet 261 (Fig. 22) or other suitable attaching device secured to the end of the cable is placed in engagement with an abutment 262 having a screw threaded aperture to receive a screw 263 which extends through the eyelet or other attaching device and is threaded into the aperture in the abutment to rigidly secure the cable to the abutment. The arrangement is such that the abutment and the head of the screw face outwardly toward the open end of the drum and the screw is therefore accessible from the open end of the drum. The frame members 25 and 25a have openings with which the open ends of the drum register and which are provided with removable closures, the removal of which permits easy access to the cable connection. In the drum unit A, of Fig. 4, the closure is a member 126 which supports a limit switch and in drum unit B, Fig. 6, the opening in the end wall is closed by a continuous closure plate 264. Thus when a cable is to be removed or attached it is only necessary to remove the corresponding closure and the operator has free access to the connecting device.

The motor units for the two drum units are identical in construction and may take various forms, but each unit is provided with means for rigidly but detachably securing the same to its drum unit and for drivingly connecting the motor with the drive shaft of that drum unit. It is of course necessary that the speed of rotation of the motor be materially reduced as applied to the drum and, in the present instance there are three speed reductions, one of which is contained in the driving mechanism of the drum unit and the other two of which form parts of the motor unit. In the form illustrated in Figs. 10 and 11 the casing of the motor 87 is provided with an extension or casing 88 in which the reduction gearing is mounted. This extension, which is formed in two parts, being rigidly connected to the motor casing by tie rods one of which is shown at 89 in Fig. 11. The motor shaft 90 extends into the extension or gear casing 88 and is journaled in a bearing 91 carried by a partition or wall 92 within the gear casing. The end of the shaft projects beyond the wall 92 and has secured thereto a pinion 93 which meshes with a plurality of pinions 94 arranged on the inner side of the wall 92 and rotatably mounted on studs 95 mounted in that wall. The pinions 94 mesh with an internal gear 96 the hub 97 of which is rigidly secured to a shaft 98 arranged substantially in axial alinement with the motor shaft 90 and rotatably mounted in bearings 99 and 100. Rotatably mounted in the gear casing and extending about the shaft 98 is a structure 101 which is supported by a ball bearing 102 mounted on the circumferential wall of the gear casing. The bearing is of substantial axial width and the structure 101 is so secured thereto, as by a clamping ring 103, that it will be held against both axial and tilting movement with relation to the shaft 98. The shaft bearing 99 is mounted in the structure 101 adjacent the bearing 102 and the shaft bearing 100 is mounted in the inner end portion 73 of the rotatable structure 101. An intermediate portion 104 of the structure 101 is spaced radially from the shaft 98 and is provided with two circumferential series of slots 105, as shown in Fig. 12. Slidably mounted in the respective slots are two series of blades 106 and 107. The inner ends of these blades are supported respectively by eccentrics 108 and 109 rigidly secured to the shaft 98 and having their high points spaced apart 180°, anti-friction bearings 110 being interposed between the ends of the blades and the respective eccentrics. The blades are of such length that when projected by the eccentrics they will extend radially beyond the part 104 of the rotatable structure and will engage respectively the teeth of two internal gears 111 and 112 which are rigidly secured to the gear casing 88. The ends of the blades are tapered and arranged to engage the tapered teeth of the respective gears 111 and 112. There is one less blade in each series than there are teeth in the corresponding internal gear, 111 and 112, and consequently the blades of each series, as they are successively projected by the eccentrics, will so engage the teeth of the internal gears that the outward movement of the blades will impart rotative movement to the rotatable member 104. This type of reduction gearing is known commercially as the heliocentric reducer and forms no part of the present invention except in so far as it enters into combination with the other elements. Its operation is well known and further description thereof is not necessary. It will be apparent that the speed of the motor shaft is first reduced as it is transmitted to the internal gear 96 and is then further and gradually reduced by the heliocentric reducer, the part 73 of which carries the studs 72 which engage the clutch member 66 of the drum driving mechanism, as shown in Fig. 4. Oil seals 113 are interposed between the part 73 of the rotatable structure 104 and the annular end wall 114 of the gear casing and an oil seal 115 is interposed between the motor shaft 90 and the wall 92 of the gear casing, thus so sealing the space within the gear casing that oil or grease may be contained therein for the proper lubrication of the gearing. When the motor unit is to be attached to the drum unit the studs 72 are inserted in the slots of the clutch member 66 and the annular projection 116 on the member 73 extends into the space between the hub 67a of the clutch member 66 and the flange 65 and has supporting engagement with said hub. The motor unit is rigidly secured to the drum unit by tie rods 117 which are mounted in apertured lugs 118 carried by the motor casing and have screw threaded inner ends which are screwed into threaded sockets in the outer frame member 25 of the drum unit, as shown in Fig. 11. A split ring 119 is placed about each rod 117 to prevent its accidental removal from the lugs when it is detached from the drum unit. The end wall 114 of the gear casing is provided with tapered recesses 114a to receive a series of tapered studs 114b secured to the housing 64 of the drum unit to center the motor with relation thereto, the tapered shape of the studs facilitating their entrance into the recesses and enabling the motor unit to be easily disengaged from the drum unit.

The self-locking device above described prevents the rotation, or overcoasting, of the drums by the load on the cables, but it is also desirable that means be provided to quickly stop the rotation of each motor shaft when the flow of current to the motor is interrupted, thus preventing the overcoasting of the motor when the load is being either lifted or lowered. In the mechanism here illustrated each motor is equipped with a magnetically controlled automatic brake which is set whenever the motor is not energized and is magnetically released when the motor is energized. In the form shown in Fig. 10 this brake comprises a friction member or disk 230 rigidly secured to the shaft 90 of the motor and a second non-rotatable friction member or disk 231 mounted for movement into and out of frictional engagement with the friction member 230, one or both members being preferably faced with friction material. The friction member or disk 231 is annular in form and is mounted about the motor shaft but is supported independently therefor axial movement. As here shown, the member or disk 231 is slidably supported on a series of studs 232 carried by the motor casing and spaced about the shaft. In this arrangement the casing is provided with cavities 233 in which the studs are mounted and beyond the open ends of which they project through openings in the disk 231. Mounted in each cavity and confined between the end wall thereof and the disk 230 is a spring 234, these springs acting on the disk 231 to move the same toward the disk 230 and press the same against that disk with sufficient pressure to quickly check, and positively prevent the further rotation of, the motor shaft 90 and thereby prevent the rotation of the cable drum. Arranged within the motor casing, about the motor shaft and on the outer side of the disk 231, is an annular electro-magnet 235 which is rigidly secured to the casing. The disk 231 constitutes an armature for this magnet and when the magnet is energized it attracts that armature and thus moves the disk out of frictional contact with the fixed disk 230, thereby releasing the brake. The brake is so connected with the motor circuit that it will be deenergized when the flow of current to the motor is interrupted. It may be directly connected in the motor circuit but, in the present instance, the two brakes are provided with separate circuits which are formed in part only by the motor circuits and these separate circuits are controlled by the controlling devices for the motor circuits, as will be hereinafter described in connection with the circuit diagram of Fig. 27.

The control unit or box F which includes the various relays and control devices for the motor circuits, may be supported independently of the drum units but in the present arrangement I prefer to mount the same on the drum units, as shown in Figs. 1 and 2. For this purpose the box is provided at its ends with flanges or lugs 120 adapted to rest upon the upper portions of the outer frame members 25 and 25a and these flanges are provided with openings adapted to receive studs 121 rigidly secured to the respective frame members, each stud having a circumferential groove arranged just above the flange. Slidably mounted on the flange adjacent to each stud is a latch member 122, see Figs. 19 and 20, having its end slotted at 123 to receive the grooved portion of the stud 121. The open end of the slot is of a width slightly less than the diameter of the grooved portion of the stud and the lateral portions of the latch having sufficient resiliency to permit the slot to spread slightly as it engages the stud and to close about the same so as to prevent the accidental disengagement of the latch from the stud.

The bombs are located in exact predetermined positions in the bomb bay of the airplane and usually several bombs are supported one above the other. It is desirable therefore that means be provided for automatically controlling the elevation to which each bomb will be hoisted and for this purpose I have provided a limit switch connected in the motor circuits and which is adjustable to cause the elevation of the load to be interrupted at any selected limit of lift. As shown more particularly in Figs. 3, 4, 15 and 16, the end member 25 of the drum unit A is provided with an opening 125 over which is secured a closure 126 having an opening 127. Rotatably mounted in the opening 127 is a member 128, having on its outer side a finger piece 129 by means of which it may be rotated. Rigidly secured to the inner side of this rotatable member 128 is a plate 130 of insulating material and secured to the plate 130 are two resilient contact members 131 and 132 which are connected by conductors extending through a conduit 133 with the circuits of both motors in the control box. Rigidly secured to the closure plate 126 is a bracket 134 which extends through the opening 125 into the space within the drum 30. Rigidly mounted in this bracket is a shaft 135 on which is rotatably mounted a gear 136 which meshes with the internal driving gear 32 of the drum. Rigidly secured to the stationary shaft 135, adjacent the gear 136, is a gear 137 and rotatably mounted on the stationary shaft in front of the gear 137 is a second gear 138 of the same diameter as the stationary gear 137 but having one more tooth than has the gear 137. The gears 137 and 138 both mesh with a plurality of planetary pinions 139 mounted on and rotating with the driving gear 136. The rotation of these pinions about the gears 137 and 138 will, due to the difference in the number of teeth thereon, cause the gear 138 to rotate the distance of one tooth for each complete rotation of the drum. Rigidly secured to the gear 138 is a disk 140 of insulating material and rigidly secured to the front face of this disk is an annular contact member 141 of conducting material with which the yieldable contacts 131 and 132 have contact to close the motor circuit through this limit switch. A portion of the annular contact member 141 is cut away to provide the latter with an insulated section. This section may be merely a recess exposing the surface of the insulating disk 140 but I prefer to provide the same with a filler 142 which is insulated from the annular member 141, so as to maintain a smooth surface throughout the face of the annular member 141. The recess in the annular contact member, and its filler 142, are located in one edge portion of the annular member, in the present instance the outer edge, and are of a radial width less than the width of the annular member, so that the inner portion of the annular member is continuous, as shown in Fig. 16. The contact 132 is spaced from the axis of the annular member such a distance that as the latter rotates the insulated section thereof may be brought into engagement with the contact 132 and the circuit broken. The contact 131 is spaced from the axis of the annular member a lesser distance so that it will remain in engagement with the continuous inner portion of the annular member throughout the rotation of the latter. When a load is to be hoisted the rotatable member 128 is adjusted to space one of the yieldable contact members, in the present instance the contact member 132, a distance from the insulated section 142 determined by the elevation to which the load is to be hoisted, the rotatable member 128 being provided on its outer surface with vernier graduations to enable the contact member to be accurately adjusted. As the load is hoisted a predetermined amount of cable will be wound onto the drum upon each rotation of the latter and the gear 138 and annular contact member 141 will be advanced one step for each rotation of the drum. When the drum has made the number of rotations necessary to elevate the load to the predetermined height the contact member 132 will be moved into engagement with the insulated section 142 and both motor circuits will be interrupted and the rotation of both drums will be immediately stopped.

It is also desirable to provide means operating automatically to prevent the rotation of the drums by the motors after the cables have been entirely, or substantially entirely, unwound from the drums and it is preferable that this means should be controlled by the windings of the cables on the drums. Inasmuch as there is usually the same number of windings on the two drums a single controlling device could control the rotation of both drums but I prefer to provide two controlling devices associated with the respective drums and either of which will stop the rotation of both drums by interrupting the operation of the two motors. In the apparatus here illustrated a limit switch is associated with each drum and connected with a circuit common to both motors. An actuating device for the limit switch is arranged to engage a winding, or windings, of the cable, at a point spaced from the point at which the cable is attached to the drum, to maintain the switch closed as long as it is in engagement with that winding and to cause the switch to be opened when that winding is moved out of engagement with the actuating device. The switch may be mounted in any suitable location which will permit the actuating device to engage a cable winding near the attached end of the cable, and, as here shown, it is mounted in the control box F. The switch and its actuating device may be of any suitable construction and I have illustrated a simple construction which is efficient in operation. As shown in Fig. 23, the switch comprises a fixed contact 270 connected with one side of the motor circuit, in the control box, and a movable contact 271 carried by an actuating lever 272 and connected with the other side of the motor circuit by a flexible conductor, not shown. The actuating lever is pivotally mounted, at that end opposite the movable contact 271, on a fixed support, as shown at 273. A cable engaging element, preferably a roller 274, is connected with the lever between the pivotal axis thereof and the movable contact and is arranged to engage a winding of the cable 80, preferably the last complete winding, and to support the movable contact in circuit closing engagement with the fixed contact. Therefore the motor circuit will be closed until said last winding is moved out of engagement with the roller 274 and the actuating lever 272 released for movement to circuit opening position. The circuit opening movement of the lever may be automatically effected in various ways, but, in the present arrangement, the weight of the lever and the parts carried thereby is sufficient to quickly actuate the lever when it is released. In this arrangement the roller engages the cable at the top of the drum and when the last winding passes from beneath the roller only a portion of that winding will be in contact with the drum, but it will be obvious that if it is desired to stop the rotation of the drum while a larger portion of the cable is in contact therewith it is only necessary to position the roller for engagement with a winding preceding the last winding.

It will be remembered that the self-locking device, 65—74, automatically locks the drum against rotation by the load thereon when the operation of the motor is interrupted and therefore the opening of either the cable controlled limit switch 270—271 or the drum controlled limit switch 131—140 will result not only in stopping the motor but also in positively locking the drum against rotation.

In order that the drums may be positively driven in a lowering direction as well as in a hoisting direction I have provided each power unit with a reversible motor, each of which includes a forward or hoisting winding and a reverse or lowering winding. The circuits for these windings, as well as the circuits for the associated devices may be controlled in any suitable manner but it is preferable that the hoisting circuits for both motors shall be opened and closed simultaneously and that the lowering circuits for both motors shall be opened and closed simultaneously. The brake circuits should be opened either simultaneously with the motor circuits or immediately prior thereto. It may be desirable in some installations that the initial hoisting operation shall be effected at a relatively low speed to give the operator an opportunity to determine whether or not the load is properly supported on the cables and is in proper position, and that the hoisting speed then be increased to elevate the load to its final position. In the circuit diagram of Fig. 27 I have shown a simple and efficient arrangement of circuits and controls for effecting these operations. In that diagram the armature of motor 87 is indicated at 145 and the armature of motor 87a is indicated at 145a. The hoisting windings of the two motors are indicated respectively at 146 and 146a and the lowering windings of the two motors are indicated respectively at 147 and 147a. The hoisting winding 146 is connected with a conductor 148 having two branches 149 and 150, and the hoisting winding 146a is connected with a conductor 151 also having two branches 152 and 153. The branches 149 and 152 of the two hoisting circuits are provided with resistors 154 and 154a and these resistors are connected through an adjustable member 155 and a conductor 156 with the conductor A of the main power circuit. The flow of current through the conductor 156 is controlled by one switch member of a two switch relay 157. The branches 150 and 153 of the respective hoisting circuits are connected by a single conductor 158 with the conductor A. The flow of current through the branches 150 and 153 is controlled by a two switch relay 159. The lowering windings 147 and 147a are connected by conductors 160 and 161 with a conductor 162 leading to the power line. The flow of current through conductor 162 is controlled by one switch of a two switch relay 163. The armature 145 of motor 87 is connected through a conductor 164, reversing switch 165, conductors 166 and 167, with the conductor B of the power line. The armature 145a of motor 87a is connected through a conductor 168, reversing switch 165, conductors 169, 170 and 167 with the conductor B. The flow of current through conductors 168 and 170 is controlled by a normally closed single switch relay 171 for a purpose which will hereinafter appear. The motor 87 may be connected with the conductor B through the conductor 170 by changing the position of the reversing switch from its full line position to its dotted line position.

The brake magnets 235 are connected by conductors 172 and 173 with a conductor 174 which is connected with the conductor 156 of the slow hoisting circuits, this connection being controlled by the second switch of relay 157. The conductor 174 is also connected by a conductor 175 with the conductor 162 and this connection is controlled by the second switch of relay 163. The several conductors for the motor units extend through conduits 178 and 178a to the control box F, in which are located the relays, reversing switch, etc., the power line being connected with the control box, as shown at 179 in Fig. 1. The connections between the conduits and the control box are of a well known quick detachable type.

The motor units here illustrated may be operated with a twenty-four volt current and therefore one end of the winding of each of the relays is connected directly with the power line conductor A. However, if it is desired to operate on a higher voltage it is obvious that a separate source of low voltage current may be connected with the relays. The other ends of the windings of the several relays are connected by long conductors extending through a flexible conduit 180 with a portable switch unit containing a plurality of switches to effect the desired control of the relays, as shown at 181 in Fig. 1. In the present installation the switch unit contains three push button switches one of which is adapted to control two circuits and each of the other two of which controls a single circuit. The two position switch, 182, controls the hoisting circuits and the speed at which the load is hoisted. This switch comprises three fixed contacts, the contact 183 being connected by a conductor 184 with one side of the winding of the relay 157, the other side of said winding being connected by conductor 184a with conductor A of the power line; and the contact 185 being connected by a conductor 186 with one side of the winding of the relay 159, the other side of that winding being connected by conductor 186a with conductor 184a; and the contact 187 being connected through conductor 188 with conductor B of the power circuit. The movable switch member 189 is of such a character, as will be hereinafter explained, as to first connect contacts 183 and 187 to energize relay 157 and thereby initiate the slow hoist operation, and at the same time to release the brakes on both motors. Further movement by the movable switch member 189 connects contact 185 with the contacts 183 and 187, thereby energizing relay 159 to increase the speed of operation, while maintaining the relay 157 energized to close the brake circuits and release the brakes. In the one position switch 200 the contact 201 is connected through conductor 188 with conductor B of the power line and the contact 202 is connected by conductor 203 with one side of the winding of relay 163, the other side of that winding being connected by conductor 204 with conductor A. Thus the operation of the movable switch member 205 will cause the lowering circuits and the brake circuits to be energized. The drum controlled limit switch is located in conductor 184a between the power line A and the conductor 186, as indicated at 131, so that when the limit switch is opened both hoisting circuits will be deenergized and the brakes of both motors will be set, and the cable controlled limit switch is located in conductor 204, as indicated at 271, so as to interrupt the lowering circuits and set the brakes when the desired portions of the cables have been unwound from the drums.

The third switch of the switch unit is actuated to deenergize the relay 171 when it is desired to prevent the operation of one motor and the circuit for the relay may be connected across the power line in any suitable manner. As here shown, one side of the winding for the relay 171 is connected by conductor 206 with the conductor 174 of the brake circuit, which is closed when either of the switches, 182 or 200, is operated. The other end of that winding is connected by a conductor 207 with a contact 208 of a normally closed switch 209, the other contact 210 of which is connected through conductor 188 with conductor B of the power line. When the movable member 212 of switch 209 is actuated to open the circuit the relay 171 is deenergized and the flow of current through conductors 169 and 170 is prevented. As has been heretofore explained the conductors 169 and 170 may be connected with either of the motors through the reversing switch 165, and when it is desired to rotate one drum with relation to the other drum the motor for the drum which is not to be rotated is connected with the conductors 169 and 170 by the reversing switch 165, and the normally closed push button switch 209 is actuated to deenergize the relay 171, thus interrupting the circuit through conductors 169 and 170, and the closing of switch 182 or 200 will energize one motor only. When, as shown in the diagram, motor 87a is connected with conductors 169 and 170 the opening of the relay switch 171 will prevent the closing of the circuit through that motor and will also deenergize the brake magnet 235 for that motor, said magnet being connected with conductor B of the power line through conductors 169 and 170.

The portable switch unit 181 is preferably of such size and shape that it can be grasped by the hand of the operator and the switches selectively operated by his fingers, thus enabling him to carry the switch with him as he moves from place to place in observing the operation of the hoisting mechanism. As shown it is in the form of an elongate casing 181a through one side of which the push buttons extend. Within the casing are arranged the three controlling switches 182, 209 and 200. The two position switch 182, as shown in Figs. 25 and 26, comprises a base 213 mounted within the casing and a push rod 214 slidably mounted in the base. Mounted on this base are four fixed terminal contacts. The terminal fitting 187 is provided with two contact points one of which is shown at 215 in Fig. 25 as arranged diametrically opposite the contact 185. The second contact of terminal fitting 187 is mounted opposite the fixed contact 183. The movable contact member 189 is shown as comprising two contact bars 189a and 189b. The bar 189a is provided with a central depressed portion 216 through which the push rod extends and to which the rod is rigidly secured. At each end of this bar are contact members 217 and 218 cooperating with the fixed contacts 215 and 185. The contact bar 189b extends transversely to the bar 189a and is normally supported on the depressed portion 216 of the latter, it being held normally in contact therewith by a spring 219. The bar 189b is provided at its ends with contact members 220 and 221 cooperating respectively with the fixed contact 183 and the second contact on the terminal fitting 187. A spring 222 supports the push rod and the contact bars normally in their elevated open positions and when in these positions the contacts of the bar 189a lie in a plane above the plane of the contacts on the bar 189b. When the push button 223 of the push rod 214 is depressed both contact bars move downwardly until the contacts on the bar 189b engage the cooperating fixed contacts, thus closing the circuit through the relay 157 for the slow hoist circuits. The downward movement of the bar 189b is thus limited by the fixed contacts and a further downward movement of the push button will cause the bar 189a to move downward with relation to the bar 189b and thus bring the contacts thereon into engagement with the cooperating fixed contacts to close the circuit through the relay 159 for the fast hoisting circuits. The one position switch 200 comprises a bar 205 movably supported by a spring pressed rod, similar to the rod 214, and when depressed engages fixed contacts 201 and 202 which are connected respectively with conductors 188 and 203, thereby energizing the relay 163 to close the lowering circuits.

In the normally closed one-position switch 209 the fixed contacts are on the lower sides of the terminal fittings 208 and 210, and are connected with conductors 207 and 188. The movable contact member 212 has its end portions extending beneath the fixed contacts and is maintained in engagement therewith by a spring acting on a rod to which the member is secured. A push button 225 is connected with the member 212 to separate the contacts and thus open the circuit to deenergize the relay 171 and open the selected motor circuit.

The portable switch unit may be of any suitable size and shape and the several switches may be arranged in various positions with relation one to the other, but the arrangement illustrated is a very convenient one and tends to avoid errors in the selective operation of the switches. The elongate casing is provided at one end with a flange to which is secured a closure and the conductors are led into the casing at that end thereof opposite the flange, so that the latter in no way interferes with the grasping of the casing in the hand of the operator. The switches are in a line lengthwise of the casing and the push buttons are spaced apart such distances that they may be conveniently operated by the fingers of the hand which grasps the casing. The casing is grasped by the hand with the little finger adjacent the end through which the conductors extend and is usually supported in a more or less upright position, with the flanged end uppermost. The switch which energizes the hoist circuits is adjacent the flanged end, that is, the upper end, of the casing, the switch which energizes the lowering circuits is adjacent the lower end of the casing, and the switch which prevents the energizing of one motor, sometimes called the "roll" switch, is between the other two switches. Thus the location of the switches is associated with their functions and renders it improbable that the wrong switch will be operated, due to hurry or excitement. The arrangement also enables a new operator to quickly familiarize himself with the operation of the mechanism.

The casing of the portable switch unit is preferably of a weather proof construction and the joints therein may be tightly sealed in any suitable manner. The openings in the side wall through which the push buttons extend is provided with a cover 223a of flexible material, preferably synthetic rubber, such as neoprene, which is substantially impervious to oil as well as to moisture. This cover extends across the outer end of the push button and is preferably curved outwardly so that it may be flexed inwardly to actuate the push button.

It is also desirable that means shall be provided for operating the hoisting mechanism manually in the event electric power is not available or should fail. For this purpose there are provided hand operated actuating devices each having a series of studs adapted to enter the slots in the clutch member 66 of the driving mechanism and thus permit this mechanism to be manually operated. One such actuating device is shown in Figs. 17 and 18, and comprises a socket member 236 having an enlarged end 237 provided with an opening in which is rotatably mounted a cylindrical member or hub 238 which is provided on its peripheral surface with ratchet teeth 239. The member 238 has, at each end of the ratchet teeth, bearing surfaces 240 which engage the circumferential walls of openings in the respective sides of the socket member 236. A flange 241 at one end of the hub 238 overlaps the adjacent side wall of the socket member and a plate 242 rigidly secured to the other end of the hub overlaps the other side wall of the socket member, thus retaining the hub in the socket member and preventing the axial movement thereof while permitting its free rotation in the socket member. The hub is provided with a series of studs 243 of the same size and arrangement as the studs 72 of the motor unit and adapted to enter the slots in the clutch member 66 so that the rotation of the hub will rotate driving mechanism for the drum. Rotatably mounted in the smaller end portion of the socket member 236 is a rod or handle 244, the inner end of which is slotted, as shown at 245, and a flat pawl 246 is slidably mounted in the slotted end of the handle and is retained therein by a pin and slot connection 247 which permits a limited longitudinal movement of the pawl. A spring 248 confined between the end wall of the slot and the adjacent end of the pawl presses the latter into engagement with the peripheral surface of the hub 238. The inner end of the pawl is beveled so that the movement of the socket member in one direction will cause the pawl to ride over the ratchet teeth of the hub and upon the movement of the socket member in the other direction the pawl will engage a tooth of the hub and rotate the latter. Thus the cable drums may be actuated by these manually operated devices when the hoist is mounted in such a position in the airplane that there is not sufficient space to permit the full rotation of a crank of the necessary length. When such space is available an ordinary crank arm may be rigidly attached to the hub 238. The hoisting mechanisms are sometimes shifted from one position to another in the airplane to enable bombs to be loaded into separate parts of the bomb bay, and in some positions the socket member of the actuating device must be moved in one direction to operate the drum and in other positions the socket member must be actuated in the opposite direction. To enable the actuating device to operate in either direction the pawl may be reversed by simply rotating the handle member 244 through an arc of 180°, thus reversing the direction in which the pawl moves to rotate the hub. Should it be desired to rotate the hub independently of the pawl the hub may be released for such rotation by rotating the handle member 244 for 90° only, thus causing the pawl to extend across the ratchet teeth in inoperative relation thereto. The pawl is yieldably retained in its adjusted position by spring pressed detents 249, mounted in the socket member and arranged to enter the corresponding recesses 250 in the handle member when the pawl is in any of its adjusted positions. The handle member is retained in the socket member by a set screw 251, the inner end of which extends into a groove 252 in the handle. If desired, means may be provided for retaining the hub and studs in operative engagement with the driving mechanism of the hoisting unit but, in the present instance, the plate 242 is provided with a hand grip 253 which may be grasped by one hand of the operator to retain the hub and studs in engagement with the driving mechanism while the other hand actuates the socket member and pawl.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a hoisting mechanism, a cable drum, a shaft supporting said drum and connected thereto for rotation thereby, a second cable drum, a shaft supporting said second drum and rotatable with relation thereto, said shafts being substantially in axial alinement, means for connecting said shafts one with the other for rotation in synchronism, separate means acting on said drums independently of said shafts to rotate said drums, friction elements connected respectively with said second drum and its shaft and cooperating to cause said second drum and its shaft to normally rotate in unison, to retard the speed of either drum which tends to rotate at a speed greater than the speed of the other drum and to permit either drum to be rotated by its rotating means while the other drum is held against rotation, and power operated means for actuating said rotating means.

2. In a hoisting mechanism, two drum units each including a frame, a shaft rotatably mounted in said frame, a cable drum supported on said shaft, and means acting on said drum to rotate the same, means for securing said frames in fixed relative positions with said shafts substantially in axial alinement, means for connecting said shafts with the respective drums for rotation thereby, the connecting means of at least one of said units comprising friction elements to cause the shaft and drum to normally rotate in synchronism and to permit the relative rotation thereof under certain operating conditions, means for connecting said shafts one with the other for rotation in unison, and means for separately actuating the rotating means for the respective drums.

3. In a hoisting mechanism, two drum units each including a frame, a shaft rotatably mounted in said frame, a cable drum supported on said shaft, and means acting on said drum to rotate the same, means for securing said frames in fixed relative positions with said shafts substantially in axial alinement, means for connecting said shafts with the respective drums for rotation thereby, the connecting means of at least one of said units comprising friction elements to cause the shaft and drum to normally rotate in unison and to permit the relative rotation thereof under certain operating conditions, cooperating parts carried by the respective shafts and movable into interlocking engagement by the movement of said units into said relatively fixed positions to automatically connect said shafts for rotation in synchronism, and means for separately actuating the rotating means for the respective drums.

4. A twin drum hoisting mechanism comprising two separately portable cable drum units having means whereby they may be quickly and detachably mounted on a supporting structure with said drums substantially in axial alinement, each unit including mechanism for rotating its drum, two separately portable motor units having means for quickly and detachably mounting the same on the respective drum units and drivingly connecting the motors thereof with the rotating mechanisms of the respective units, electrical means for controlling the operation of said motor units, a control box enclosing said electrical means, and means for quickly and detachably mounting said control box on said drum units and connecting said electrical means with said motor units.

5. In a hoisting mechanism, a drum unit comprising an end frame member having an opening therethrough, a removable closure for said opening, a drum rotatably mounted on said frame and having in one end thereof an opening adapted to register with the opening in said frame member and having a peripheral opening adjacent the other end thereof through which the end portion of a cable may extend, said drum also having within the same and adjacent to said peripheral opening an abutment facing the first mentioned opening therein, adapted to receive and support an apertured attaching device on said cable and having a screw threaded opening, and a screw to extend through said attaching device into the opening in said abutment, said screw being accessible through said opening in said frame member when said first mentioned opening in said drum registers therewith.

6. In a hoisting mechanism comprising a cable drum and a shaft drivingly connected with said drum, an element mounted on said shaft for rotation therewith, a stationary brake member arranged about the axis of said shaft, a movable brake member supported between said rotatable element and said stationary member, an actuating device having means for rotating said rotatable element and said movable brake member in unison in either direction, said rotatable element and said movable brake member having a plurality of pairs of opposed inclined surfaces, and balls supported between said rotatable element and said movable brake member in inoperative relation to said inclined surfaces when said parts are rotated in unison and movable into wedging engagement with said inclined surfaces to move said movable brake member into braking engagement with said stationary brake member when said rotatable element tends to rotate with relation to said movable brake member by reason of rotative force exerted thereon by said shaft.

7. In a device for controlling the rotation of a shaft, a locking member extending about the axis of said shaft and fixed against rotation, a second locking member supported about said axis for axial movement into locking engagement with said fixed locking member, a third member extending about and connected with said shaft for rotation therewith, said third member and said second locking member having opposed tapered grooves, a ball supported in said opposed grooves, and an actuating device having means for rotating said third member and said second locking member in either direction in fixed relative positions with said ball in an inoperative position, said third member being rotatable with relation to said second locking member by force exerted thereon by said shaft to wedge said ball in said grooves and move said second locking member into locking engagement with said fixed locking member.

8. In a mechanism including a shaft, a locking member supported about said shaft and fixed against rotation therewith, a driving member connected with said shaft in spaced relation to said locking member, an annular member supported about said shaft between said driving member and said locking member for rotation about the axis of said shaft and movable axially into locking engagement with said locking member, an actuating device having means for rotating said driving member and said annular member in fixed relative positions, said driving member being rotatable with relation to said annular member by force exerted thereon by said shaft, said driving member and said annular member having opposed tapered grooves, and a ball supported in said opposed grooves to move said annular member into locking engagement with said fixed locking member when said driving member is rotated with relation to said annular member by said shaft.

9. In a mechanism including a shaft, a locking member supported about said shaft and fixed against rotation therewith, a driving member connected with said shaft in spaced relation to said locking member, an annular member supported about said shaft between said driving member and said locking member for rotation about the axis of said shaft and movable axially into locking engagement with said locking member, an actuating device having means for rotating said driving member and said annular member in fixed relative positions, said driving member being rotatable with relation to said annular member by force exerted thereon by said shaft, said driving member and said annular member having opposed tapered grooves, a ball supported in said opposed grooves to move said annular member into locking engagement with said fixed locking member when said driving member is rotated with relation to said annular member by said shaft, and yieldable means for advancing said annular member with relation to said driving member to retain said ball in contact with the walls of both grooves while said driving member and said annular member rotate in fixed relative positions.

10. In a mechanism including a shaft, a locking member supported about said shaft and fixed against rotation therewith, a driving member connected with said shaft in spaced relation to said locking member, an annular member supported about said shaft between said driving member and said locking member for rotation about the axis of said shaft and movable axially into locking engagement with said locking member, said driving member and said annular member having overlapping slots, an actuating device supported in operative relation to said shaft and having a stud projecting through said slots to rotate said driving member and said annular member in fixed relative positions when said actuating device is rotated in either direction, said driving member being rotatable with relation to said annular member by force exerted thereon by said shaft, said driving member and said annular member having opposed tapered grooves, and a ball supported in said opposed grooves to move said annular member into locking engagement with said fixed locking member when said driving member is rotated with relation to said annular member by said shaft.

11. In a hoisting mechanism, a cable drum, means including a shaft to rotate said drum, a driving member for said shaft, a locking member arranged adjacent said shaft and fixed against rotation, a normally inoperative second locking member mounted between said driving member and said fixed locking member for movement into and out of locking relation to said fixed locking member, means for rotating said driving member and said inoperative locking member in fixed relative positions, said driving member being rotatable with relation to said inoperative locking member by force exerted thereon by said shaft, means controlled by the relative rotation of said driving member and said inoperative locking member to move the latter into locking relation to said fixed locking member, and cooperating friction elements connected respectively with said driving member and said shaft and positively held in constant frictional contact to drivingly connect said driving member with said shaft and to cause said driving member to be instantly locked against rotation when said shaft is suddenly subjected to an excessive force tending to rotate the same in load lowering direction with relation to said inoperative locking member, said friction elements being capable of a slight relative movement to check the rotation of said force and to absorb the shock thereof.

12. In a hoisting mechanism, a cable drum, means including a shaft to rotate said drum, an annular driving member for said shaft, an annular locking member arranged about the axis of said shaft and fixed against rotation, a second and normally inoperative annular locking member mounted between said driving member and said fixed locking member for movement into and out of locking relation to said fixed locking member, means for rotating said driving member and said inoperative locking member with relation to said fixed locking member and in fixed positions with relation one to the other, said driving member being rotatable with relation to said inoperative locking member by a force exerted thereon by said shaft, means controlled by the rotation of said driving member with relation to said inoperative locking member to move the latter into locking relation to said fixed locking member, and cooperating friction elements connected respectively with said driving member and said shaft, held in constant frictional contact sufficient to impart load lifting rotation to said shaft and capable of a slight relative movement when said shaft is suddenly subjected to an excessive force tending to rotate the same in load lowering direction, whereby said force will rotate said driving member with relation to said inoperative locking member and cause the latter to be moved into locking relation to said fixed locking member and said friction elements will absorb the shock of said force and quickly stop said rotation of said shaft.

13. In a hoisting mechanism comprising a cable drum and a shaft for rotating said drum, a rotatable element having means for operatively connecting the same with said shaft to rotate said shaft in either direction, normally inoperative means controlled by rotative force exerted on said shaft by said drum to lock said shaft against rotation, said rotatable element being provided on its exterior surface with elongate ratchet teeth extending lengthwise thereof, a socket member supported on said rotatable element for oscillatory movement about the axis thereof, an operating member mounted in said socket member for rotation therein about an axis transverse to the axis of said rotatable element, a pawl yieldably connected with said operating member and having a relatively wide end portion to engage said ratchet teeth, said pawl being movable by the rotation of said operating member to a reverse position with relation to said ratchet teeth or to an inoperative position transverse to said ratchet teeth, and means carried by said socket member to retain said pawl in an adjusted position.

14. In a control mechanism for a hoisting mechanism including two cable drums and two electric motors for separately rotating said drums, a normally open circuit breaker and closer in circuit with both motors, a normally closed circuit breaker and closer in circuit with one only of said motors, separate electrically controlled means for actuating the respective circuit breakers and closers, and a device connected with said actuating means and including a switch to cause the actuating means for said normally open circuit breaker and closer to close the same, and a second switch to cause the actuating means for said normally closed circuit breaker and closer to open the same, whereby both motors or one only of said motors may be energized at the will of the operator.

15. In a control mechanism for a hoisting mechanism including two cable drums and two electric motors for separately rotating said drums, a normally open circuit breaker and closer in circuit with both motors, a normally closed circuit breaker and closer, means for connecting said normally closed circuit breaker and closer in circuit with either of said motors, separate electrically controlled means for actuating the respective circuit breakers and closers, and a device connected with said actuating means including a switch to cause the actuating means for said normally open circuit breaker and closer to close the same, and a second switch to cause the actuating means for said normally closed circuit breaker and closer to open the same, whereby both motors or a selected one of said motors may be energized at the will of the operator.

16. In a control mechanism for a hoisting mechanism including two cable drums and two reversible electric motors for separately rotating said drums, each motor having two circuits for rotating the same respectively in a forward direction and in a reverse direction, normally open circuit breakers and closers connected respectively in the forward circuits and the reversing circuits of the two motors, a normally closed circuit breaker and closer in circuit with one of said motors, separate electrically controlled means for actuating the respective circuit breakers and closers, and a switch unit comprising an elongate casing of a size and shape to be carried in the hand of the operator, three switches mounted in said casing, spaced apart lengthwise thereof, each switch having an actuating element operable from the exterior of said casing by the fingers of the operator, means for connecting one of said switches with the actuating means for the circuit breakers and closers in the forward circuits of both motors, means for connecting the second switch with the actuating means for the reversing circuits of both motors, and means for connecting the third switch with the actuating means for said normally closed circuit breaker and closer.

17. In a hoisting mechanism, two cable drums, power operated means for rotating said drums, electrically controlled means to cause said rotating means to rotate both drums either in load hoisting direction or in load lowering direction, other electrically controlled means to prevent the rotation of one of said drums by said rotating means, and a switch unit comprising an elongate structure adapted to be carried in the hand of the operator, two switches arranged adjacent the respective ends of said structure and so connected with the first mentioned electrically controlled means that the operation of one of said switches will cause both drums to rotate in hoisting direction and the operation of the other of said switches will cause both drums to rotate in lowering direction, and a third switch arranged between the first mentioned switches and connected with the last mentioned electrically controlled means to prevent the rotation of one of said drums when one of said first mentioned switches is operated.

18. In a hoisting mechanism, two cable drums, two electric motors for rotating said drums, each motor having a hoisting winding and a lowering winding, an electrically controlled device for simultaneously energizing the hoisting windings of both motors, a second electrically controlled device for simultaneously energizing the lowering windings of both motors, a third electrically controlled device to prevent the energizing of one of said motors, and a switch unit comprising an elongate casing adapted to be grasped in the hand of the operator and supported in a substantially upright position, three switches mounted in said casing, the operating elements for the respective switches being spaced apart lengthwise of said casing and operable from the exterior thereof, and conductors entering said casing through the lower end thereof and connecting said switches with the respective electrically controlled devices, the switch adjacent the upper end of said casing being connected with the first mentioned device to cause the hoisting windings of both motors to be simultaneously energized, the switch adjacent the lower end of said casing being connected with the second device to cause the lowering windings of both motors to be simultaneously energized, and the intermediate switch being connected with the third device to prevent the energizing of one of said motors.

19. In a hoisting mechanism, a frame having a part forming a housing, a cable drum rotatably mounted on said frame, a driving shaft connected with said drum and extending through said housing, an annular driving member in said housing connected with said shaft for rotation therewith in either direction, means for locking said driving member against rotation including an annular locking member rotatable about the axis of said shaft, and means controlled by relative rotation of said members for moving said locking member into locking engagement with a part fixed with relation to said housing, and a motor unit having means for mounting the same on said housing substantially in line with said shaft and including a motor and a rotatable element driven by said motor, said rotatable element having a part to extend into said housing in operative relation to said driving member and said locking member when said motor unit is mounted on said housing and cause said members to be rotated in fixed relative positions by said rotatable element.

GEORGE H. LELAND.